(12) United States Patent
Kwon

(10) Patent No.: US 9,073,479 B2
(45) Date of Patent: Jul. 7, 2015

(54) LIGHT EMITTING WHEEL HUB

(76) Inventor: Soon Chang Kwon, Glendale, CA (US)

( * ) Notice: Subject to any disclaimer, the term of this patent is extended or adjusted under 35 U.S.C. 154(b) by 203 days.

(21) Appl. No.: 13/066,724

(22) Filed: Apr. 21, 2011

(65) Prior Publication Data

US 2014/0133171 A1    May 15, 2014

(51) Int. Cl.
| | |
|---|---|
| *B60Q 1/00* | (2006.01) |
| *B60Q 1/26* | (2006.01) |
| *B60Q 1/32* | (2006.01) |
| *A63C 17/26* | (2006.01) |
| *F21V 33/00* | (2006.01) |
| *A63C 17/22* | (2006.01) |

(52) U.S. Cl.
CPC .............. *B60Q 1/326* (2013.01); *A63C 17/26* (2013.01); *F21V 33/0068* (2013.01); *A63C 17/223* (2013.01); *A63C 2203/14* (2013.01)

(58) Field of Classification Search
CPC ........ B60Q 1/00; B60Q 1/326; A63C 17/223; A63C 17/26

USPC .......................................... 362/500, 511, 473
See application file for complete search history.

(56) References Cited

U.S. PATENT DOCUMENTS

| 5,580,093 | A | * | 12/1996 | Conway ......................... 280/816 |
| 5,718,499 | A | * | 2/1998 | De Caro ......................... 362/464 |
| 6,322,237 | B1 | * | 11/2001 | Lee ................................ 362/500 |
| 6,398,395 | B1 | * | 6/2002 | Hyun ............................. 362/500 |
| 6,703,716 | B2 | * | 3/2004 | Chiu ............................. 290/1 R |
| 6,749,321 | B2 | * | 6/2004 | Luo ................................ 362/192 |
| 7,001,051 | B2 | * | 2/2006 | Palmer et al. ................. 362/473 |
| 2005/0030755 | A1 | * | 2/2005 | Thomas et al. ............... 362/500 |
| 2007/0285938 | A1 | * | 12/2007 | Palmer et al. ................. 362/500 |

* cited by examiner

*Primary Examiner* — Jason Moon Han
(74) *Attorney, Agent, or Firm* — Peter Chin

(57) ABSTRACT

The present inventive compact generator, light emitting wheel hub has an improved light and armature assembly that simplifies manufacturing, improves function and durability of the light emitting wheel hub. The inventive wheel hub is useful for such wheels used in skate board, roller skate, in-line roller skate, wheel chair, and like apparatus.

19 Claims, 11 Drawing Sheets

LIGHT EMITTING WHEEL HUB

STATEMENT REGARDING FEDERAL SPONSORSHIP

No invention claimed in this application was made under Federally sponsored research or development.

BACKGROUND OF THE INVENTION

1. Field of the Invention

The present invention relates to an improved more reliable light emitting wheel hub for a light emitting wheel and method for making the same. The light emitting wheel is useful for skate board, roller skate, in-line roller skate, wheel chair and like apparatus. The invention additionally provides for greater efficiency in mass production, especially in automated mass production of a light emitting wheel.

2. Description of the Related Art

There have been a number of attempts to produce a satisfactory light emitting wheel that could be mass produced. In particular, the armature assembly or yoke of the compact generator have been positioned or embedded in the wheel hub of the wheel that rotates around a permanent magnet positioned on the wheel axle of the type shown in U.S. Pat. No. 6,398,395.

The patent discloses a compact generator and light emitting wheel. The coil bobbin or spool of the armature assembly of the compact generator is shown in FIG. 2. Each lead wire extends from the coil through a respective guide element 145, which is advantageously a tube. The lead wire is secured at the narrow portion 146 prior to connecting to the light emitting device. The coil bobbin is then combined with an armature cover bearing armature arms to form an armature assembly. A polymer or resin is injection molded around the armature assembly and fixedly incorporated or embedded to form a wheel hub. A conductive plate or printed circuit board bearing light emitting device such as a LED (light emitting diode) is connected to the wheel hub to form a wheel hub assembly and subsequently a wheel tire using resin or polymer such as polyurethane is molded around the wheel hub.

Korea Patent Application 10-2000-0086367 published Jul. 12, 2002 shows an improvement on the armature assembly of type shown in U.S. Pat. No. 6,398,395 and is shown in FIG. 3. In order to provide a better connection between the lead wires of the coil bobbin, and the light emitting device, lead wire 142b is guided from the coil on grooves in block extension 142a and connected to conductive pin 142d which is subsequently connected to the light emitting device. The lead wires are manually wrapped around respective conductive pins.

Korea Patent Application 10-2006-0027308, published Aug. 22, 2007 improved the prior art armature assembly shown in FIG. 2, by simplifying the connection of the lead wires and thereby the manufacturing process through a modification of the prior armature assembly and is shown in FIG. 4. Lead wires 202 and 206 from coil bobbin 207 protrude outside armature cover 200 and 201 and are manually connected to armature cover extensions 203 and 205. Armature covers 200 and 201 bear armature arms 204. Armature extensions connect with a light emitting device, a conductive plate or printed circuit board bearing a LED. This design was prone to frequent lead wire separation or breakage and electrical failure at the contact point with the armature cover extensions during injection molding of the wheel hub.

Korea Patent Application 10-2006-0058747, published Jun. 6, 2006 also discloses an improvement of the over the prior art armature assembly shown in FIG. 2. As seen in FIG. 5, coil bobbin 210 has extensions 212 and 217 where upon lead wires 214 and 215 from the wire coil is secured to prior to injection molding of the wheel hub and manually connecting the lead wires to armature cover extensions 208 and 209 of armature covers 211 and 216.

The above prior art patents employ thin fragile lead wires that are drawn out and away from the coil bobbin outside the armature cover and manually connected to the light emitting device as in the aforementioned US patent or to an extension of the armature cover as in the aforementioned Korea Patent Applications. Wheels incorporating compact generators of US patent and Korea Patent Application were prone to circuit failure in the manufacturing process because of frequent breakage of the lead wire from the coil bobbin during manual manipulation to connect the thin lead wire to the light emitting device or to the conductive pins.

The Korea Patent Applications had additional problem of the lead wire separating from the conductive pin or from the armature cover extension during high pressure and temperature injection molding of the wheel hub resulting in loss of conductive contact and electrical failure. This problem is exacerbated because the lead wires are not soldered to the conductive pins or armature cover extensions because of the high temperature and pressure of the injection molding process.

The lights of the above prior art wheels were not reliable as the fragile very thin lead wire connecting the conductive pins or posts frequently broke during under stress and shock of hard use or under cold temperatures. This was especially evident when the wheels were used for skates and skate boards.

The introduction of air bubbles in the polymer wheel during the cast molding of the polymer tire onto the prior art wheel hub bearing the armature assembly and light emitting device is another problem that frequently occurred, which reduce quality and production efficiency.

SUMMARY OF THE INVENTION

The presently disclosed invention is an improvement over the compact generator and light emitting wheel of U.S. Pat. No. 6,398,395 which is hereby incorporated by reference in its entirety. The present invention addresses and solves the aforementioned problem creating a much more reliable and durable light emitting wheel. An improved armature assembly wherein the very thin lead wire from the coil bobbin is no longer exposed externally to manufacturing and operational stress and forces that could easily severed the lead wire of the prior art light emitting wheel. The improvement also simplifies the manufacturing process by reducing the number of manual manipulations and allowing for greater automated assembly of the wheel. In an embodiment of the present invention that featured at least two diametrically opposing light emitting devices in the wheel hub, the present inventive coil bobbin allows for operation of at least light emitting device in the event that one light emitting device failed. This embodiment during operation, was capable of producing the appearance (to the human eye) of a continuous line of light at low speeds thus reducing "blinking" light visual effect at low speeds that was problematic of prior art wheels with a single light emitting device.

Another improvement is in the structure of a wheel hub portion or cap that covers or overlies the light emitting surface mounted device (SMD), e.g., LED chip mounted on a conductive or printed circuit board (LED-SMD). The improvement allows for bubble free cast molding of the wheel, in particular injection molding a wheel tire of a suitable material such as resin or polymer like polyurethane onto the preformed wheel.

DETAILED DESCRIPTION OF THE INVENTION

The present invention solves the above mentioned problem of wire breakage by a new and improved armature assembly or yoke. The problem of air bubble formation during cast molding of the wheel tire was solved by a specially designed wheel hub rim portion.

Figure 1:
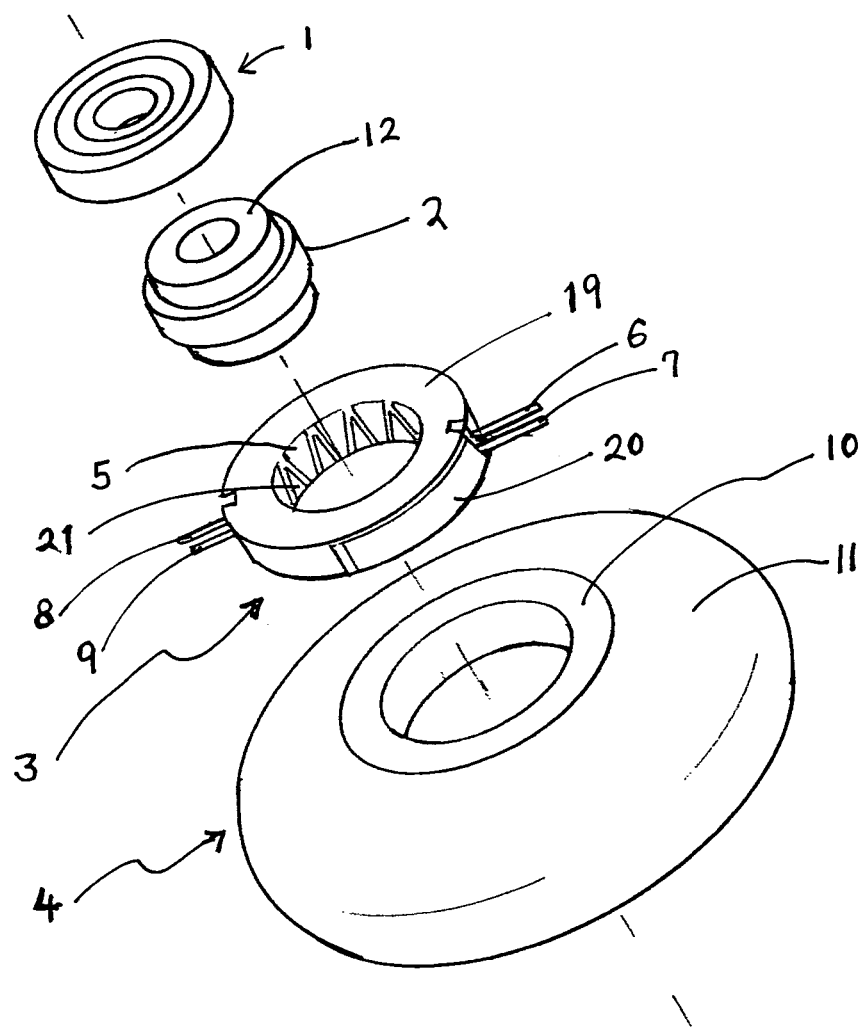
FIG. 1 shows an exploded perspective view of the compact generator and wheel of the present invention.
Figure 2:
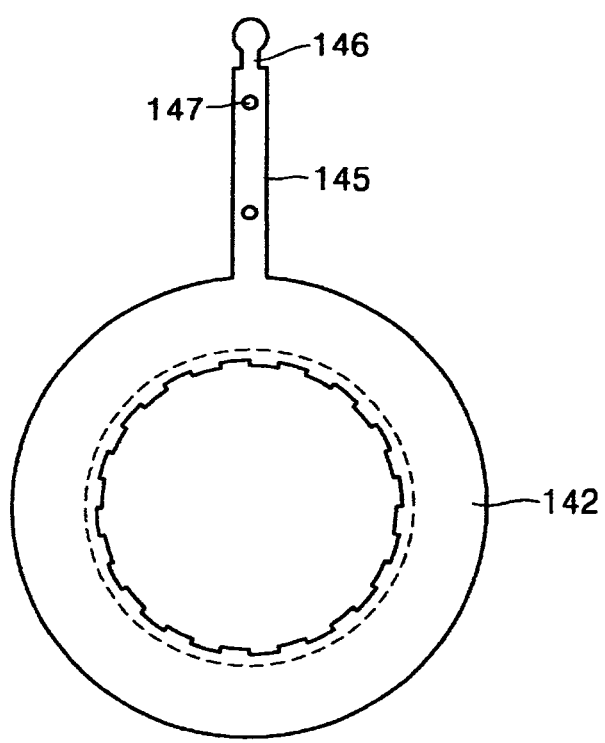
FIG. 2 shows a prior art coil bobbin for a compact generator.
Figure 3:
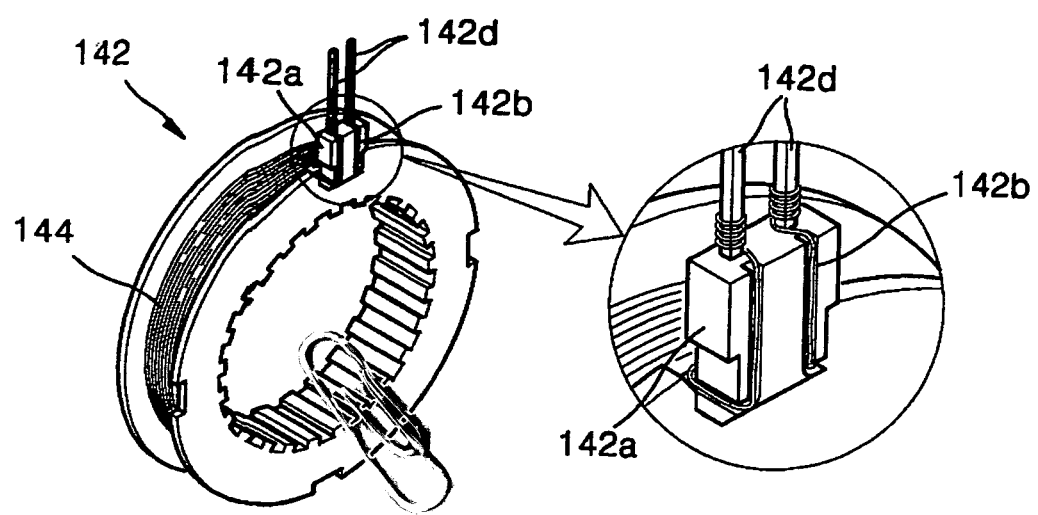
FIG. 3 shows another prior art another coil bobbin and armature assembly for a compact generator
Figure 4:
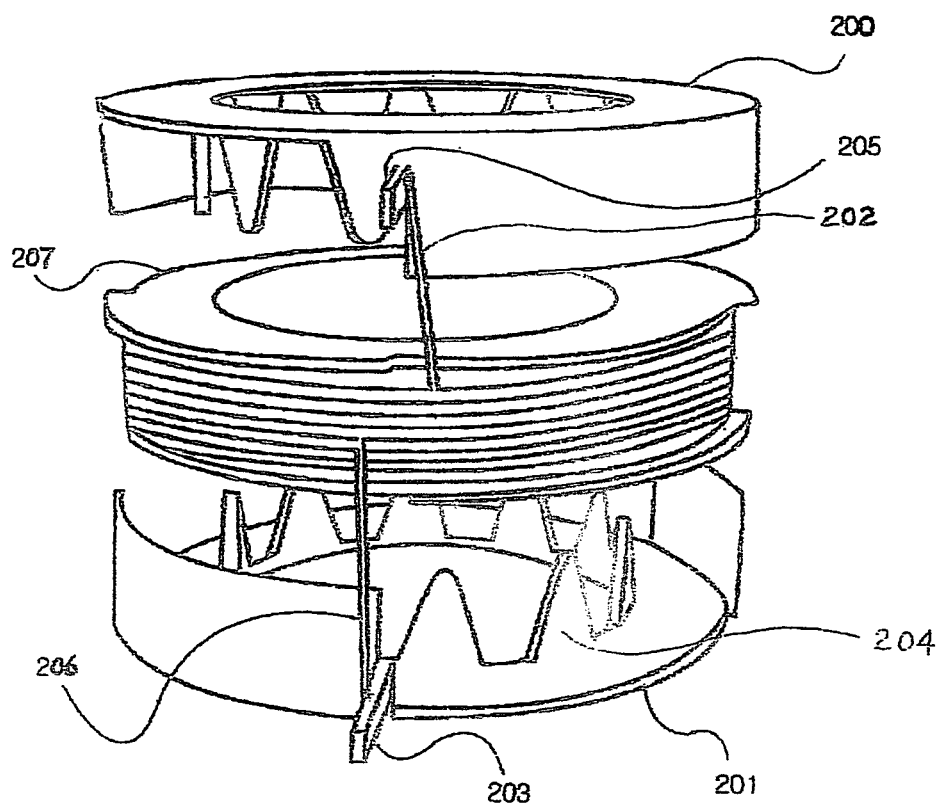
FIG. 4 shows another prior art coil bobbin and armature assembly for a compact generator.
Figure 5:
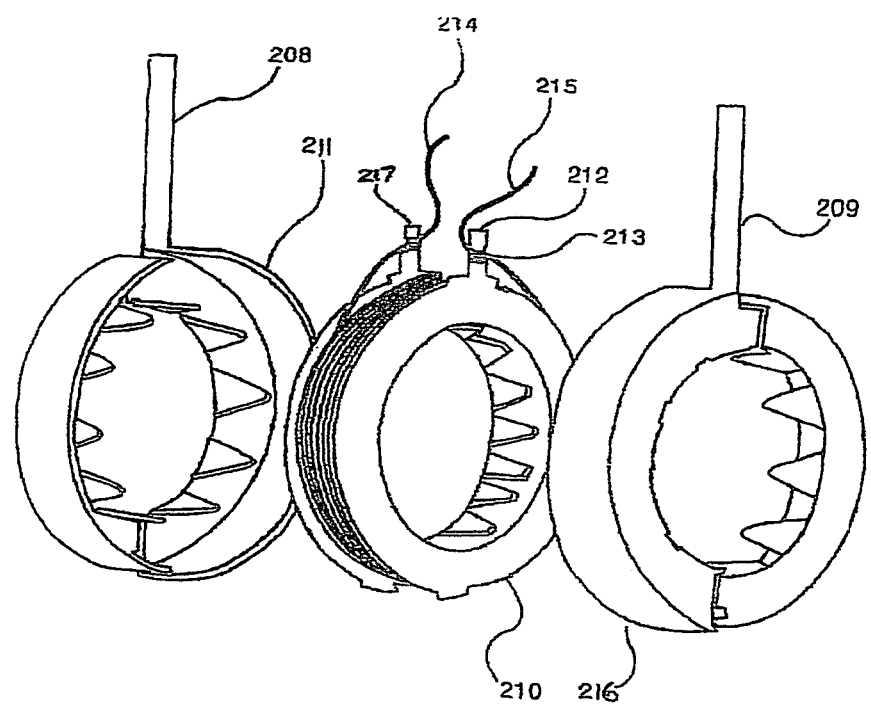
FIG. 5 shows a third prior art coil bobbin

FIG. 1 shows the overall compact generator and wheel. The inventive generator as noted above is an improvement on the generator of US Patent 6,398,395 and operates by basic principles disclosed therein. Wheel 4 has tire 11 which overlies wheel hub 10 containing armature assembly 3. An electric current is generated when armature assembly 3 revolves around permanent magnet 2 carried on cylindrical element 12. Element 12 can be, but not necessarily, the type of buffer containing support element for supporting the permanent magnet as disclosed in the aforementioned US Patent. The Fig is shown with wheel bearing 1, the other opposite wheel bearing 32 is not shown in this Fig. A wheel axle (not shown) passes through the central opening of the wheel bearings and cylindrical element bearing permanent magnet 2.

Figure 6:
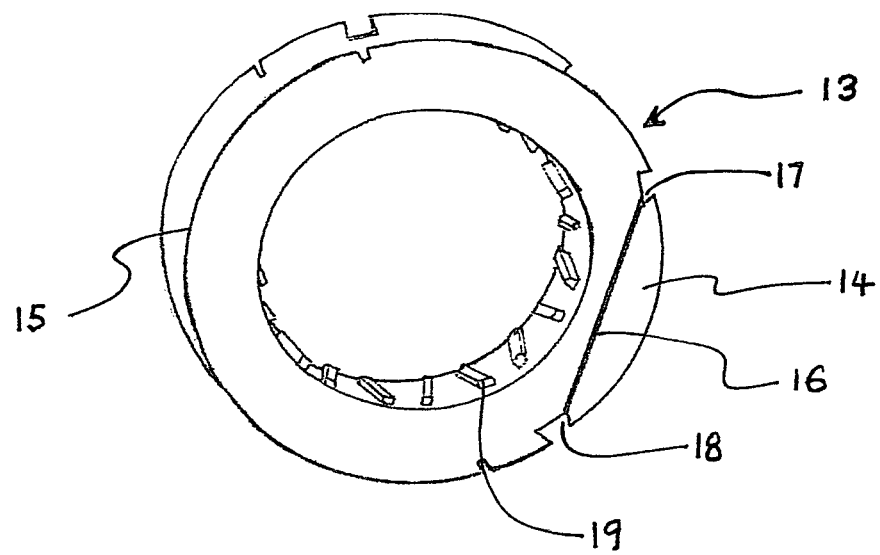
FIG. 6 is a perspective view of the wire coil bobbin of the present invention.

FIG. 6 shows the present inventive wire coil bobbin 13 of the armature assembly. A thin electrically conductive wire is wound on the bobbin 31 and one lead wire 16 is drawn across one edge 17 of the outward facing of wall 14 and lies along a length to an opposing edge 18 of the outer face of side wall 14 of the bobbin and secured thereto and the other lead wire (not shown) in a similar fashion is drawn of one edge of the outer face of opposite side wall 15 lies along a length across the outer face of opposite side of wall 15 to an opposing edge on the side wall forming the wire coil bobbin 13. Each lead wire has sufficient length across the outer faces of outer walls 14 and 15 of coil bobbin 13 such that after the wheel hub is injection molded around the armature assembly that electrical contact is substantially maintained along the length of the wire exposed across the outward face of the wall of the wire coil bobbin. This innovation is a critical component of the present invention which avoids and solves the problem of the prior art armature assembly's exposure of thin wire to stresses and/shock that caused breakage or separation and loss of electrical contact with light emitting device during the manufacturing process and/or during operation of the wheel as mentioned above. This substantially increases the reliability and allows for simpler and more efficient mass production of the light emitting wheel. The bobbin has armature spacers 52 which guide assembly of the armature cover bearing armature arms 5 and maintains proper spacing between the alternating armature arms of armature covers. The spacers are integral part of the bobbin and can be simultaneously molded with molding of the bobbin. This feature facilitates automated or robotic assembly the light emitting wheel.

There are two armature covers 19 and 20 and each cover bears at least one electrically conductive extension or post. As shown in the figures, Armature cover 19 has armature arms 5 and electrically conductive extension or post 6 and further can advantageously, if desired, have diametrically positioned electrically conductive extension or post 8. The opposing, mating armature cover 20 has corresponding armature arms 21, electrically conductive extension 7 and similarly can advantageously have diametrically positioned electrically conductive extensions 9. When a second LED-SMD is desired, cover 19 is provided with have diametrically positioned electrically conductive extension or post 8 and cover 20 with corresponding extension or post 9. The armature arms of one armature cover are positioned such that they alternate with the armature arms of the other armature cover when the armature covers are assembled with wire coil bobbin. The two armature covers at least partially enclose the wire coil bobbin and are sufficiently spaced apart to prevent electrical contact in the final armature assembly and wheel hub. Armature cover with conductive extensions and armature arms can advantageously be a unitary structure formed from a single plate of a suitable material such as steel, which is inexpensive and a readily available material.

Figure 7:
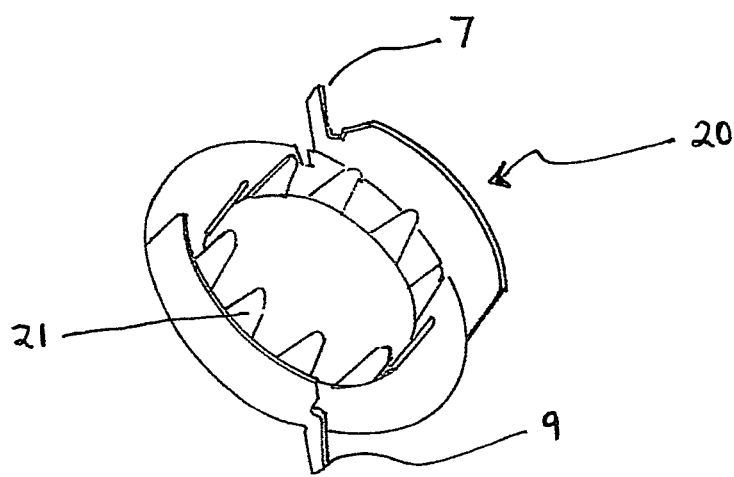
FIG. 7 is a perspective view of one of the armature covers of the present invention.
Figure 10:
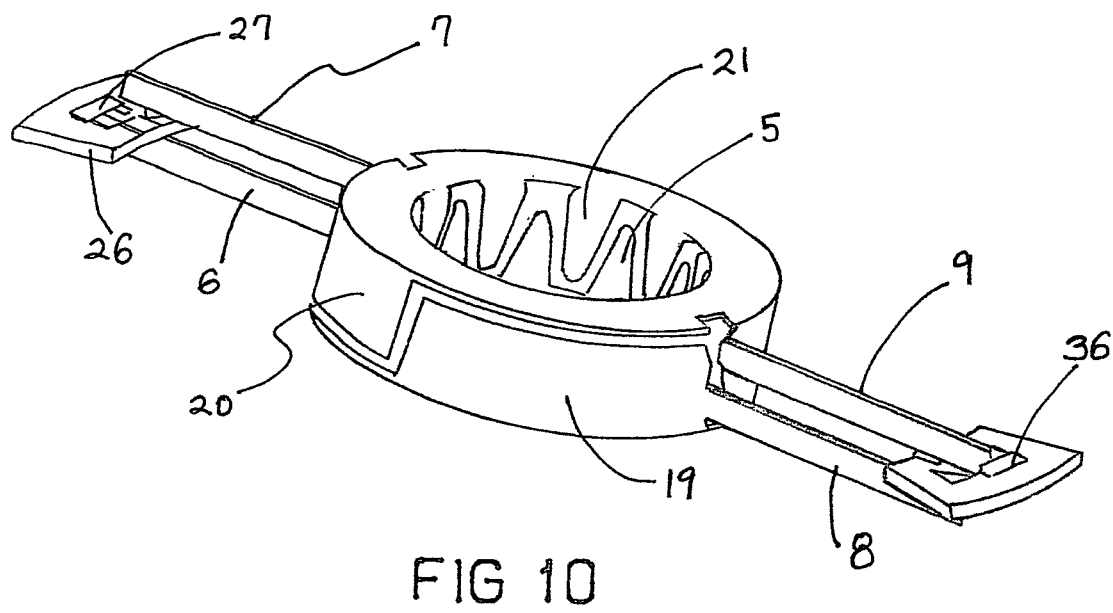
FIG. 10 is a perspective view showing the armature assembly and light emitting device.
Figure 12:
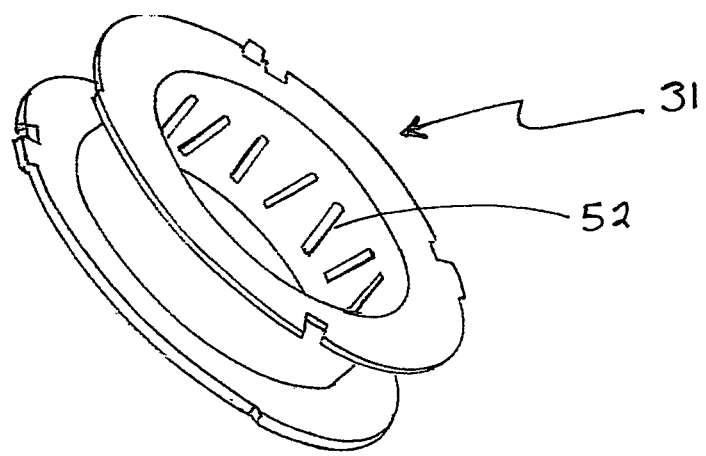
FIG. 12 is a perspective view of the bobbin of the present invention.

Wire coil bobbin 13 is placed between the two armature covers 19 and 20 to form an armature assembly as shown in FIG. 7 and the wheel hub 10 is injection molded with an around it. The ends of the extensions are then connected to the light emitting device, which can be light emitting diode (LED) or any suitable solid state light emitting material or chip surface mounted on a conductive plate or printed circuit board, i.e., a surface mounted light emitting device (SMD) or it can be a bulb type LED. This structural relationship is shown in FIG. 10.

Figure 8:
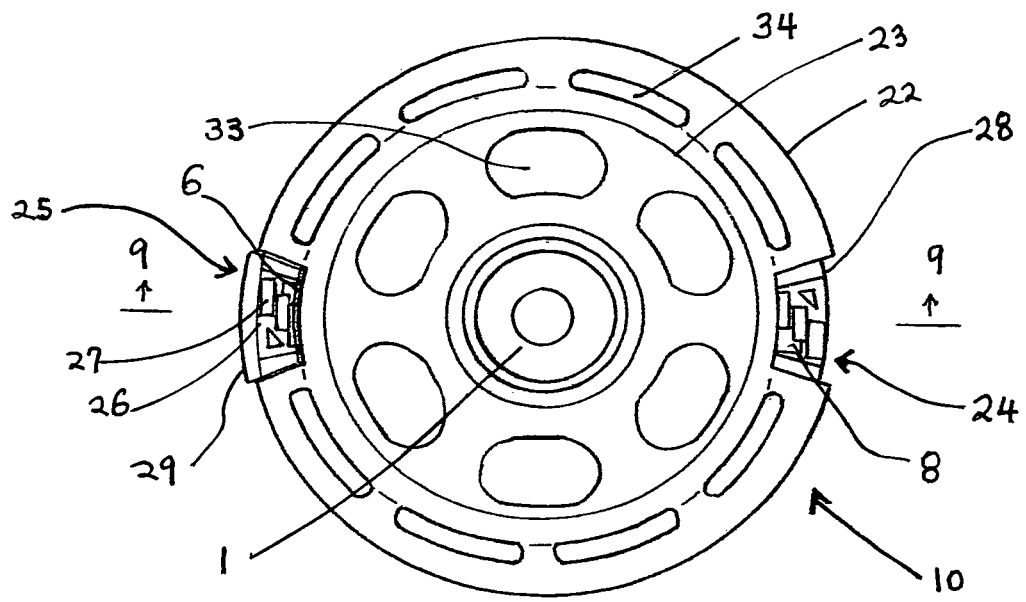
FIG. 8 is a side elevation view of the wheel hub and, light emitting device of the present invention.
Figure 9:
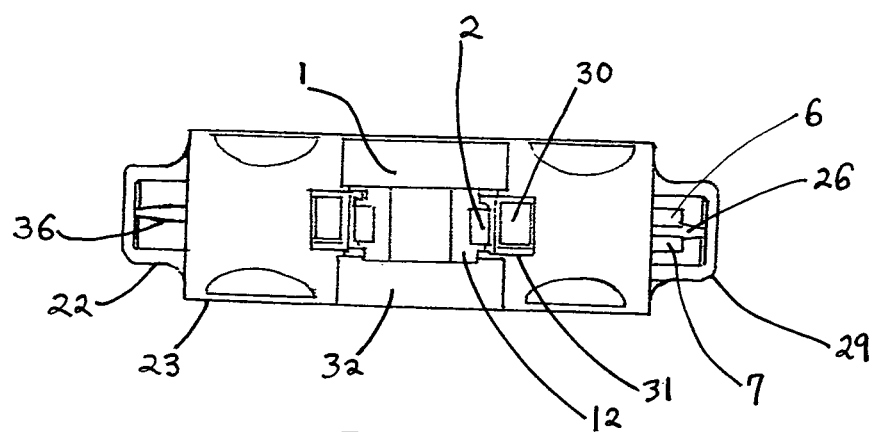
FIG. 9 is a sectional view taken across a plane shown in FIG. 8.

The one embodiment of the present inventive wheel hub for the armature cover embodiment having diametrically opposed electrically conductive extensions is shown with in FIG. 8. The wheel hub has an outer, thinner outer rim portion 22 that is conveniently integrally molded with the thicker main wheel hub body 23. The lower portion of outer rim portion 22 smoothly and curvingly merges with the upper portion of main body 23. The wheel hub outer rim portion 22 is embedded in the polymer tire. The wheel hub may optionally have openings 33 and 34. Electrically conductive extensions 6 and 8 of the armature assembly protrude into gaps 24 and 25. The gap, which subtends an arc segment of the wheel hub rim, is of sufficient dimension and shape to permit subsequent positioning and connection of the light emitting device 26 to the extensions. The gap in the rim can optionally have shoulder portion 28 that is shaped and dimensioned to receive, guide, mate with the edge and secure transparent or translucent cover or cap 29 to wheel hub. It is noted that the transparent cover over gap 24 is not shown for the purposes of illustrating the structure of the wheel hub. The walls of the gap can optionally have groove or grooves dimension to receive the edges of the light emitting device, which acts to guide and fix or secure the light emitting device, especially a surface mounted light emitting device to wheel hub in the wheel hub gap. FIG. 9 is a sectional view taken along the sectional plane shown in FIG. 8. It shows the relationship of the wire coil 30, bobbin 31, permanent magnet ring 2 carried on cylindrical support element 12. It is noted that bulb type LED may be used instead of the surface mounted LED device shown in the drawings.

Transparent or translucent cover 29 for the light emitting device of the present invention is shaped and dimensioned to cover gap 25 and smoothly conform and merge with the shape of the wheel hub rim. The transparent or translucent cover protects the light emitting device 26 and 36 and electrical connection with the armature assembly extensions during cast molding of the wheel tire onto the hub. The structural relationship of the light emitting device and the armature assembly is shown in FIG. 10.

Figure 11:
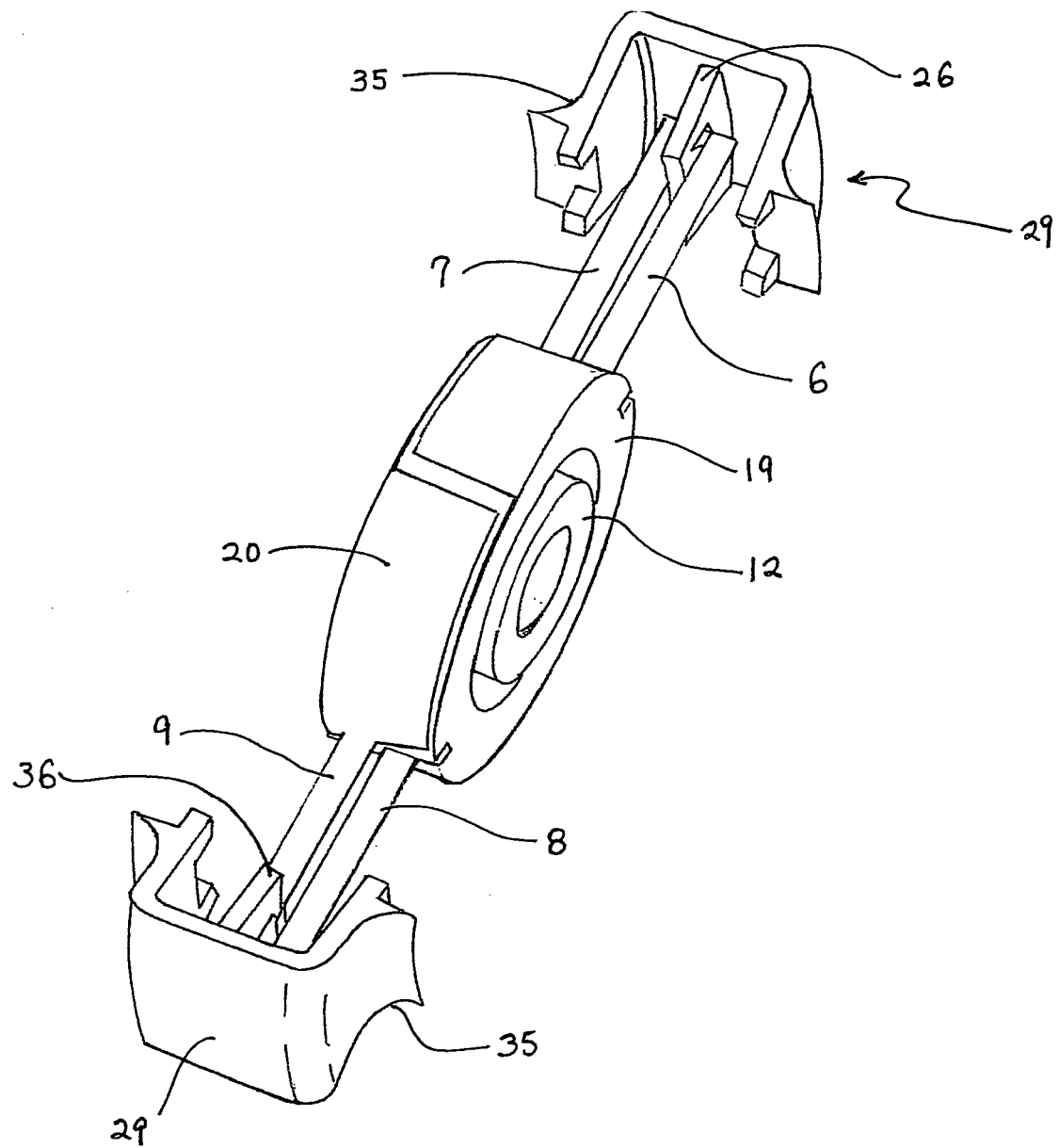
FIG. 11 is a perspective view of the armature assembly and light emitting device.

It was found that if the transparent cover extended and protruded over wheel hub rim, air either escaping from the gap space in the wheel hub or trapped on the surface that resulted in undesirable formation of air bubbles during cast molding the tire onto the wheel hub. The present inventive cover because of its shape eliminates the formation air bubbles during the cast molding of the tire onto the wheel hub. One embodiment of the transparent or translucent cover is shown in FIG. 11. In this embodiment the cap have edge extensions 35 that conform and smoothly merge with opposing surface of the main wheel hub body 23.

The light emitting device can be a surface mounted device such as an arrangement of three LED chips 27 on a conductive plate as shown. The LED configuration may be 3 staggered from top to bottom as shown in FIG. 8 or a row of two and one below. The color of the light emitting device or LEDs can be any desired color or color combinations. A very useful and advantageous and non-limiting example of a combination is the use of three color LED chip mounted SMD. Blue and green LED chips positioned in the outer portion in a row above the green LED chip achieves an unexpected visual effect of being able to see each color separately without the colors blending together as the wheel rotates in use. More than 3 LED chips or bulbs as well as their arrangement can be used in the present invention. As noted previously, LED bulb type can be used instead.

The use of two opposed LED-SMD in the wheel hub such as shown in FIGS. 8 and 10 advantageously reduces the lead time such that the light from the LED appears to be continuous at lower rpm instead of being intermittent or blinking if only one LED-SMD were used. This is especially advantageous in terms of safety when the wheel hub is used for a larger wheel of a wheel chair.

Figure 13:
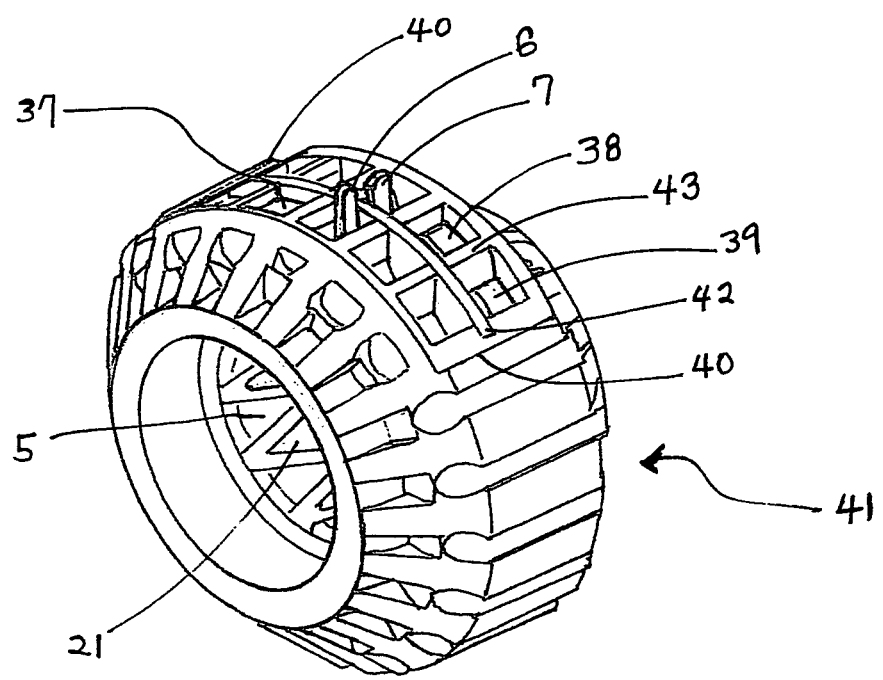
FIG. 13 is perspective view of a light emitting wheel hub of the present invention.

FIG. 13 shows another embodiment of the inventive light emitting wheel hub. The transparent cover spans across the top outer portion of the wheel hub 41. The gap is of a has a width that substantially spans the width of the top portion of the wheel hub depth that would accept the thickness of a substantially planar transparent cover (unlike the cover 29 of the previous embodiment). One end walls 40 of the gap shows a depth to accommodate the thickness of the cover. The cover overlies light emitting device comprised of LEDs 37, 38 and 39 carried on conductive plate or printed circuit board 42. Armature cover extension 6 and 7 are in electrical contact with board 42. There is a plurality of cross members 43 that guide and support the light emitting device. As before the outer surface of the transparent cover merges with and smoothly conforms to the shape and profile of the wheel.

The diameter of wheel hub can be small as approximately 40 mm, making this wheel hub configuration useful for small wheel diameter such as those used in roller skates, skate boards and aggressive skate wheels.

Figure 14:
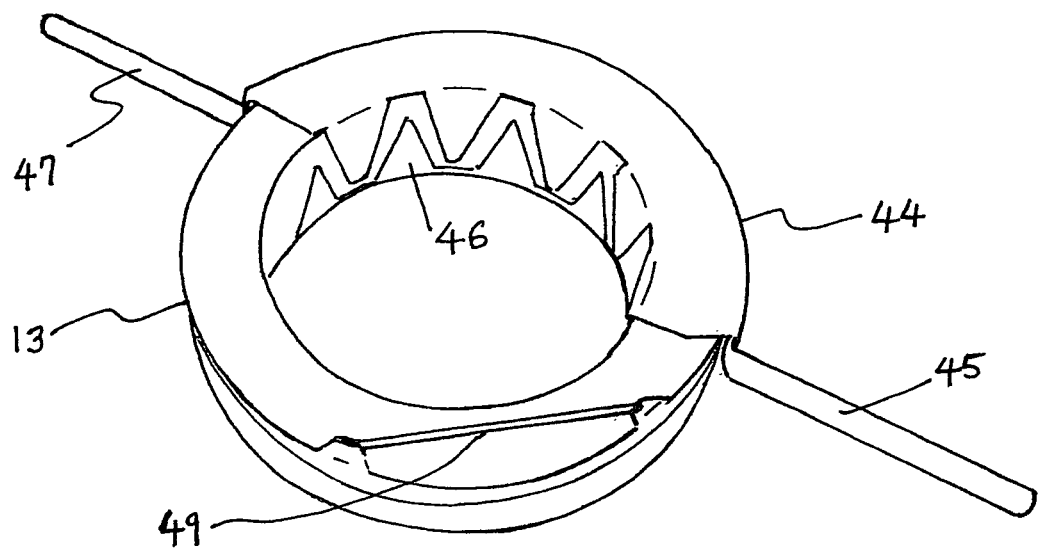
FIG. 14 is a perspective view of another embodiment of the armature cover and coil bobbin.
Figure 15:
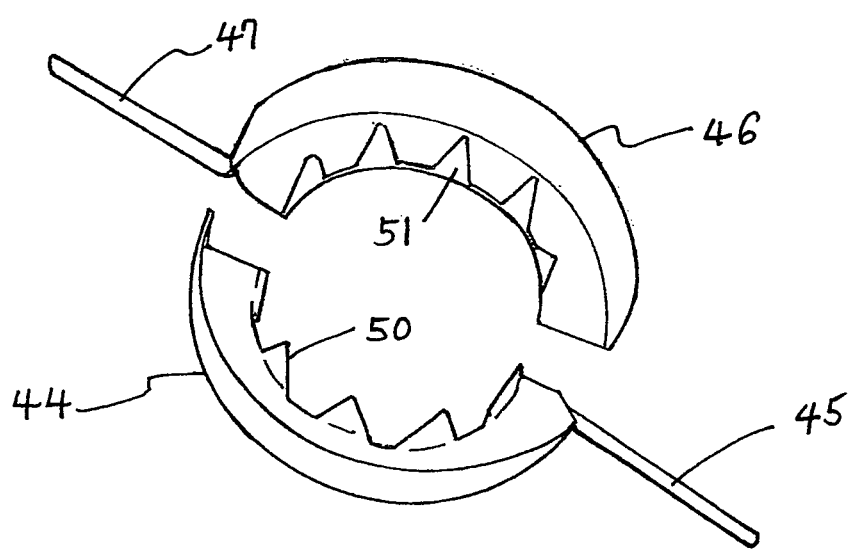
FIG. 15 is perspective view of the 2 opposing section of 4 part armature cover shown in FIG. 14.

FIGS. 14 and 15 illustrates a further embodiment of an armature cover according to the present invention. It is a 4 part armature cover. FIGS. 14 and 15 shows two of the four section or part armature cover: top armature cover portion 44 with conductive extension or post 45 and cooperating lower armature cover portion 46 with conductive extension or post 47. Armature covers 44 and 46 bear armature arms 50 and 51, respectively. The other two armature cover portions have not been shown in order to better illustrate the structure but would be similar to the two shown and have appropriate conductive extension or post to create a one or more LED-SMD in the wheel hub. The use of 4 part armature cover had an unexpected benefit in improving the manufacture of the wheel hub and reliability. There was better and more consistent electrical contact was formed between the coil bobbin when the armature cover was pressed against the lead wire on the outside wall of coil bobbin during plastic injection molding of the wheel hub around armature cover and coil bobbin.

The use of LED chip mounted SMD provided a distinct advantage over LED bulb as it emitted more uniform light in all directions whereas the LED bulb was more directional in the intensity, i.e., it was brighter from the side of the bulb than from top of the bulb. Thus, when the wheel bearing the LED-SMD rotates during use, the intensity and color is substantially uniformly visible from the side and front of the wheel.

The manufacturing process of the light emitting wheel is greatly simplified over the prior art. The conductive wire coil bobbin is simply positioned between the two armature covers and the wheel hub is injection molded with a suitable plastic or polymer, which can be opaque, around the armature assembly. The high pressure of the injection molding process presses the armature cover against the copper wire lying across the outer face of the coil bobbin to create an electrical contact area that is substantially length of the wire lying on the face of the coil bobbin. The light emitting device is connected to the ends of the conductive extensions that protrude from the open gap, such as by soldering and the transparent or translucent cover for the light emitting device is placed over the gap and sealed to the wheel hub rim prior to cast molding a transparent or translucent polymer tire onto a portion of the wheel hub that supports the tire. The polymer may be conveniently a urethane polymer or resin. This can be all done by automation or robotic means.

It is understood that various modifications and variations of the present inventions such as material of construction and arrangement of light emitting devices, electrical and magnetic material and elements are within the purview of the present invention.

I claim:

1. A light emitting wheel hub having a rim comprising at least one light emitting means positioned in said rim, means for electrically connecting said light emitting means to an armature assembly for generating electricity, said armature assembly comprising at least two electrically conductive armature cover and a wire coil bobbin cooperatively engaged with said armature cover for generating electricity, said wire coil bobbin having opposing flat outer walls and an electrically conductive wire wound thereon, said electrically conductive wire of said wire coil bobbin having lead wires extending therefrom, each lead wire extending and traversing a predetermined length longitudinally across and supported on an outer surface of respective flat outer walls, each of said predetermined length of wire is in electrical contact with respective armature cover.

2. The light emitting wheel hub of claim 1, wherein means for electrically connecting the armature cover to said light further comprises an extension of said armature cover.

3. The light emitting wheel hub of claim 2, wherein said extension and armature cover is a single unitary structure.

4. The light emitting wheel hub of claim 1, wherein said light emitting means is positioned in an opening or recess in said rim and sealingly covered by a transparent or translucent cap.

5. The light emitting wheel hub of claim 4, wherein said wheel hub comprises a main body having a thickness and an outer rim that is thinner than said thickness of the main body, said outer rim smoothingly and curvingly merges with said main body.

6. The light emitting wheel hub of claim 5, wherein said transparent or translucent cap is positioned in the opening or recess in said thinner outer rim and has at least one lower edge curved outwardly to smoothly merge with said main body.

7. The light emitting wheel hub of claim 1, wherein said light emitting means is positioned in a recess in said wheel hub that is open to transmit light only radically out from a periphery of said wheel hub.

8. The light emitting wheel hub of claim 1, wherein at least two light emitting means are positioned in said wheel hub.

9. The light emitting wheel hub of claim 1, wherein said light emitting means comprises light emitting chips or light emitting bulbs.

10. The light emitting wheel hub of claim 9, wherein the light emitting means are three light emitting chips.

11. The light emitting wheel hub of claim 10, wherein a blue and green light emitting chips are positioned above a green light emitting chip.

12. The light emitting wheel hub of claim 1, where said armature assembly comprises four armature covers.

13. A light emitting wheel comprising a tire molded on the light emitting wheel hub of claim 1.

14. A roller skate comprising a roller skate body and at least one light emitting wheel comprising the light emitting wheel hub of claim 1.

15. A skateboard comprising a skateboard body and at least one light emitting wheel comprising the wheel hub of claim 1.

16. A wheel chair comprising a wheel chair body and at least one light emitting wheel having the light emitting wheel hub of claim 1.

17. A method of molding the light emitting wheel hub of claim 1, comprising placing the armature covers over the wire coil bobbin to form said armature assembly, injection molding polymer around said armature assembly to form said wheel hub.

18. A method of making a light emitting wheel comprising injection molding polymer around the armature assembly of claim 1 to form said light emitting wheel hub; and molding polymer around said wheel hub to form said wheel.

19. The method of claim 18, wherein the molding polymer around said wheel hub to form said wheel comprises cast molding.

* * * * *